(12) United States Patent
Zhu et al.

(10) Patent No.: US 8,555,069 B2
(45) Date of Patent: Oct. 8, 2013

(54) FAST-RECONNECTION OF NEGOTIABLE AUTHENTICATION NETWORK CLIENTS

(75) Inventors: Liqiang Zhu, Redmond, WA (US); Paul J. Leach, Seattle, WA (US); Kevin Thomas Damour, Redmond, WA (US); David McPherson, Bothell, WA (US); Tanmoy Dutta, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 420 days.

(21) Appl. No.: 12/399,615

(22) Filed: Mar. 6, 2009

(65) Prior Publication Data

US 2010/0228982 A1 Sep. 9, 2010

(51) Int. Cl.
*H04L 29/06* (2006.01)

(52) U.S. Cl.
USPC .......................................................... 713/175

(58) Field of Classification Search
USPC ................................... 713/175; 726/2, 7, 12
See application file for complete search history.

(56) References Cited

U.S. PATENT DOCUMENTS

| | | | | |
|---|---|---|---|---|
| 6,502,192 | B1 * | 12/2002 | Nguyen ............................. | 726/4 |
| 7,281,128 | B2 * | 10/2007 | Mikel et al. ...................... | 713/155 |
| 7,383,571 | B2 * | 6/2008 | Abdo et al. ....................... | 726/3 |
| 7,434,044 | B2 * | 10/2008 | Halasz et al. ..................... | 713/155 |
| 7,458,095 | B2 * | 11/2008 | Forsberg .......................... | 726/3 |
| 7,565,526 | B1 * | 7/2009 | Shaw et al. ....................... | 713/150 |
| 7,644,275 | B2 * | 1/2010 | Mowers et al. .................... | 713/168 |
| 7,716,721 | B2 * | 5/2010 | Zavalkovsky et al. ............. | 726/2 |
| 2003/0079143 | A1 * | 4/2003 | Mikel et al. ...................... | 713/200 |
| 2004/0005883 | A1 * | 1/2004 | Lee ............................... | 455/422.1 |
| 2004/0098588 | A1 * | 5/2004 | Ohba et al. ....................... | 713/169 |
| 2004/0148504 | A1 * | 7/2004 | Forsberg .......................... | 713/168 |
| 2006/0101505 | A1 * | 5/2006 | Abdo et al. ....................... | 726/2 |
| 2006/0174323 | A1 * | 8/2006 | Brown et al. ...................... | 726/3 |
| 2006/0288213 | A1 * | 12/2006 | Gasparini et al. ................. | 713/170 |
| 2007/0256120 | A1 * | 11/2007 | Shatzkamer et al. .............. | 726/5 |
| 2008/0134311 | A1 * | 6/2008 | Medvinsky et al. ............... | 726/7 |
| 2008/0305792 | A1 * | 12/2008 | Khetawat et al. ................. | 455/435.1 |
| 2009/0288143 | A1 * | 11/2009 | Stebila et al. ..................... | 726/3 |
| 2009/0328140 | A1 * | 12/2009 | McPherson et al. .............. | 726/2 |
| 2010/0017603 | A1 * | 1/2010 | Jones ............................. | 713/168 |
| 2010/0037060 | A1 * | 2/2010 | Irvine ............................. | 713/176 |
| 2010/0177629 | A1 * | 7/2010 | Payyappilly et al. ............. | 370/216 |
| 2010/0205448 | A1 * | 8/2010 | Tarhan et al. ..................... | 713/185 |
| 2010/0217975 | A1 * | 8/2010 | Grajek et al. ..................... | 713/157 |
| 2011/0078444 | A1 * | 3/2011 | Jeong et al. ...................... | 713/170 |
| 2011/0113247 | A1 * | 5/2011 | Panasyuk et al. ................. | 713/168 |

OTHER PUBLICATIONS

Clancy T. et al., "Handover Key Management and Re-Authentication Problem Statement", RFC 5169, Mar. 2008, http://www.hjp.at/doc/rfc/rfc5169.html.*

* cited by examiner

*Primary Examiner* — Michael S McNally

(57) ABSTRACT

Modern network communications often require a client application requesting data to authenticate itself to an application providing the data. Such authentication requests can be redundant, especially in the case of stateless network protocols. When a full authentication is performed, a conversation identifier and one or more encryption keys can be agreed upon. Subsequent authentication requests can be answered with a fast reconnect token comprising the conversation identifier and a cryptographically signed version of it using the one or more encryption keys. Should additional security be desirable, a sequence number can be established and incremented in a pre-determined or a random manner to enable detection of replayed fast reconnect tokens. If the recipient can verify the fast reconnect token, the provider can be considered to have been authenticated based on the prior authentication. If an aspect of the fast re-authentication should fail, recourse can be had to the original full authentication process.

16 Claims, 9 Drawing Sheets

US 8,555,069 B2

FAST-RECONNECTION OF NEGOTIABLE AUTHENTICATION NETWORK CLIENTS

BACKGROUND

For modern computing devices, including traditional personal computers, as well as personal digital assistants, cellular telephones, and the like, network communicational abilities have become ubiquitous. As a result, an increasing amount of sensitive, personal, or otherwise secret information, is being communicated via network communications, thereby driving the development of more secure network communicational technology. Central to many secure network communicational paradigms is the notion of "authentication", whereby two communicating devices, traditionally referred to as a "client" and "server", verify one another and establish parameters for subsequent secure communications.

Many commonly used network communication protocols, however, do not support the notion of a communicational state and, instead, are "stateless", such that each communication stands alone and does not require knowledge of prior communications. When using such stateless network communication protocols, computing devices acting as a client are often requested to authenticate themselves to computing devices acting as a server. For example, to render a page of information retrieved via the ubiquitous Hyper-Text Transfer Protocol (HTTP), a computing device acting as a client may make multiple requests for data. Because HTTP is a stateless protocol, each of those requests may generate a request for the client to authenticate itself.

Modern secure network communication protocols can require authentication that can comprise multiple exchanges between a computing device acting as a client and a computing device acting as a server, or that can comprise the exchange of relatively large amounts of data. Such authentication mechanisms, when combined with the multiple requests for authentication that may be made even within the context of simple actions, such as, for example, rendering a single page of data, can add substantial overhead to network communications, thereby decreasing the efficiency of such network communications and, consequently, increasing their cost in both time and resources.

SUMMARY

Often, the authentication called for to establish secure network communication is provided by dedicated components that can be accessed in a standardized manner by higher level applications executing on the computing devices acting as the client and the server. Such dedicated components can be modified to provide for a fast reconnection, thereby providing speed and efficiency benefits to the higher level applications without requiring modification to those applications.

In one embodiment, a fast reconnection can be negotiated between a computing device acting as a client and a computing device acting as a server. Such a negotiated fast reconnection can establish a common identification of the particular connection and can establish one or more encryption keys that can enable the client and the server to encrypt and decrypt data.

In another embodiment, the negotiation of a fast reconnection can be extended to comprise the negotiation of a sequence identifier and a mechanism for incrementing the sequence identifier so as to minimize malicious interception and replay of fast reconnection messages, such as, for example, within an insecure network environment.

In a further embodiment, when an application, executing on the computing device acting as the client, receives a request to authenticate itself, and a prior authentication in accordance with an established authentication protocol has already been performed, the request for authentication can be responded to with a single fast reconnect message. The fast reconnect message can comprise the previously established connection identifier as well as a cryptographically signed version of it utilizing the previously established one or more encryption keys.

In a still further embodiment, the fast reconnection message can further comprise a sequence identifier incremented in accordance with a previously established scheme, or otherwise incremented in a manner to reduce malicious interception and replay.

In a still further embodiment, if the fast reconnect message does not succeed in authenticating the client to the server, a full authentication in accordance with an established authentication protocol can be performed again.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which

DETAILED DESCRIPTION

Figure 1:
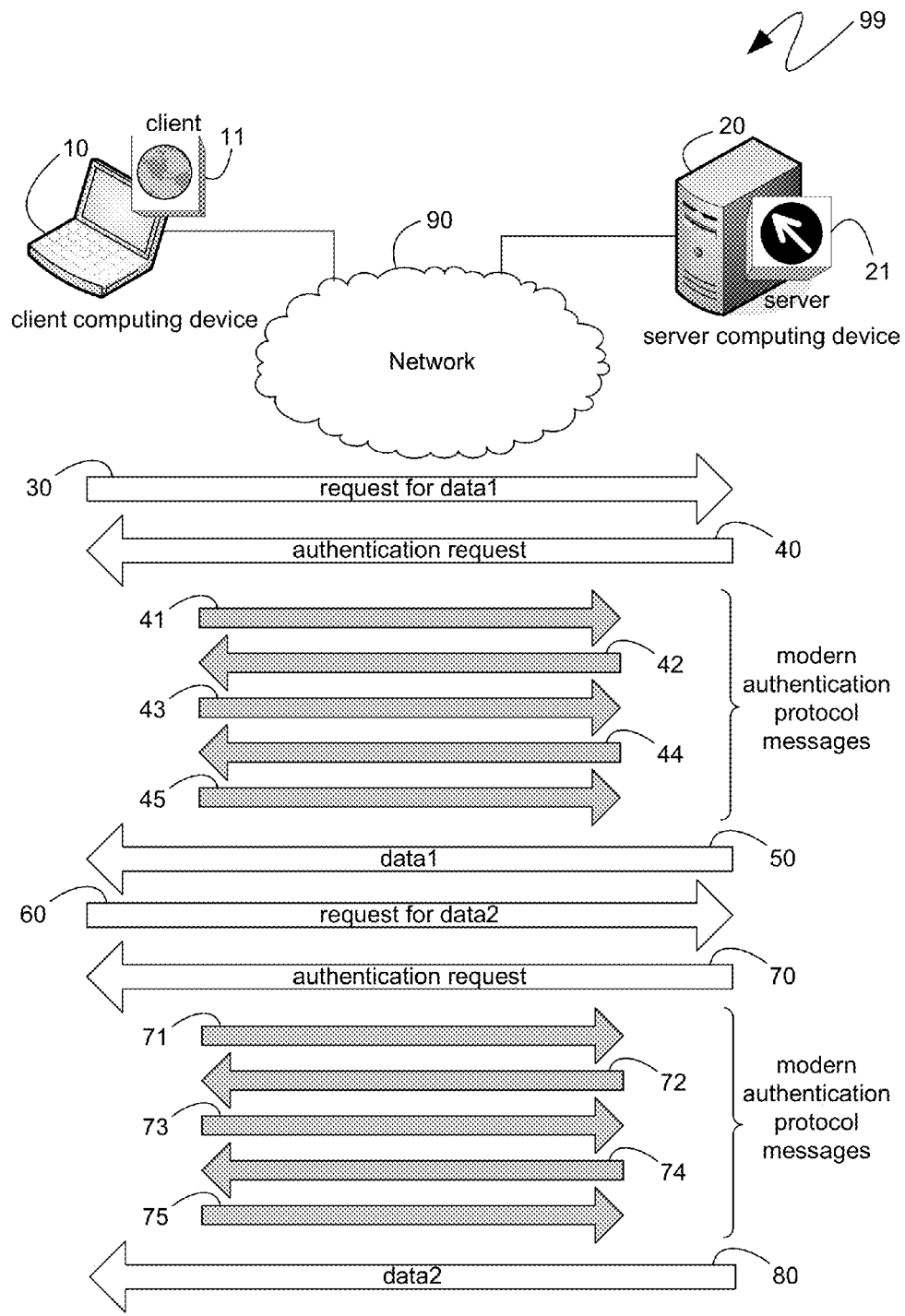
FIG. 1 is a block diagram of an exemplary series of network communications comprising traditional authentication.

The following description relates to the fast reconnection of clients to servers within an authentication context. Where a server requests that a client authenticate itself multiple times within the context of a single communicational session, a fast reconnect token can be sent, avoiding the need to perform a full authentication each time. Initially, a full authentication can be performed in accordance with an agreed upon authentication mechanism. As part of the full authentication, one or more encryption keys can be agreed upon, as can an identifier of the conversation. Subsequent authentications within the same communicational session can be performed by sending a fast reconnect token comprising the identifier of the conversation and a cryptographically signed version of that identifier, signed by the one or more encryption keys. Optionally, for greater security, a sequence number can be incremented from a prior sequence number, and the incremented sequence number and a cryptographically signed version of it can also be included within the fast reconnect token. The client can then be authenticated based on the fast reconnect token, with failed authentications resorting to a full authentication in accordance with the agreed upon authentication mechanism.

While the below descriptions are directed to the implementation of fast reconnection within existing authentication frameworks, they are not so limited. Specifically, the described fast reconnection can be implemented as part of a stand-alone authentication mechanism, or as part of a supplemental authentication mechanism that operates in parallel with, or even orthogonally to, existing systems. As such, references to existing components and infrastructure that are modified to implement fast reconnection are meant to be exemplary, and are not meant to limit the disclosure exclusively to changes to existing components or to the particular existing components enumerated.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures, where data is maintained, are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, a system 99 is shown, comprising two computing devices 10 and 20 that are communicationally coupled to one another via the network 90. In the illustrated embodiment, the computing device 10 can act as a client computing device since it can be executing a software application program 11 that can be requesting data. The software application program 11 is, therefore, referred to as the client 11. Similarly, the computing device 20 can be acting as a server computing device since it can be executing a software application program 21 that can be providing data in response to requests. Thus, the software application program 21 is referred to as the server 21.

As shown via the communications 30 through 80 of system 99, the client 11 can request some data from the server 21 via communication 30. The requested data is generically labeled "data1" in the figure to distinguish it from subsequently requested data. In response to the request 30, the server 21 may request, via communication 40, that the client 11 authenticate itself prior to the server providing the client with the requested data. Authentication requests, such as authentication request 40, are a common mechanism by which a server can protect data and ensure that it only provides data to authorized clients.

In response to the authentication request 40, the client 11 and the server 21 can exchange multiple communications, such as communications 41 through 45, in accordance with whatever application and authentication protocol they have agreed to use. Communications 41 through 45 are meant to be exemplary of any authentication exchange and are not meant to require an authentication exchange that only utilizes the five messages shown. As will be known by those skilled in the art, modern authentication protocols can require that the client 11 and server 21 exchange fewer than the five messages illustrated, but the size of each message can be substantial, especially in relation to the request for data and often in relation to the data itself and can, therefore, add substantial overhead to the transfer of data from the server 21 to the client 11. Once the authentication, illustrated by exemplary communications 41 through 45, is completed, the server 21 can provide the requested data, again nominated "data1" in the figure for ease of distinction, to the client 11, such as via communication 50.

Upon receiving communication 50, the client 11 can request, with the communication 60, additional data from the server 21. For distinction, this additional data is generically labeled "data2" in FIG. 1. If the client 11 and the server 21 are utilizing a stateless communicational protocol to communicate with one another, or if the server 21 does not retain, or otherwise does not associate with the client 11, a prior authentication, then the server may, in response to the request 60, again request, via communication 70, that the client authenticate itself. In such a case, the client 11 and the server 21 can again exchange several application and authentication messages, such as illustrated by the exemplary communications 71 through 75. Again, as before, after the authentication of the client 11 to the server 21 is completed, the server can send the requested data, nominated "data2" as indicated above, via communication 80.

As can be seen, the requests for merely two elements of data in the exemplary system 99, namely requests 30 and 60, resulted in a substantial exchange of communications, such as the communications 41 through 45 and 71 through 75, that were directed to authenticating the client 11 to the server 21. Modern authentication protocols that call for such message exchanges can add substantial overhead to network communications both in additional roundtrips and increased data traffic. For example, in the illustrated system 99, each request for data generated several additional message exchanges directed only to authentication. The reduction or elimination of authentication messages, especially those after one authentication has already been performed, such as the subsequent authentication messages 71 through 75, can substantially reduce this overhead and can enable data to be provided more efficiently.

Before proceeding with detailed descriptions of mechanisms by which such overhead can be reduced, the framework for such descriptions will first be provided. For ease of visual presentation, the computing devices 10 and 20 of the system 99 of FIG. 1 are illustrated as different types of computing devices. Such illustration, however, is strictly for ease of graphical distinction and is not meant to imply any qualitative or quantitative difference between the computing devices 10 and 20. More specifically, and turning to FIG. 2, the exemplary computing device 100 of FIG. 2 can equally act as either the client computing device 10 or the server computing device 20 of system 99.

Figure 2:
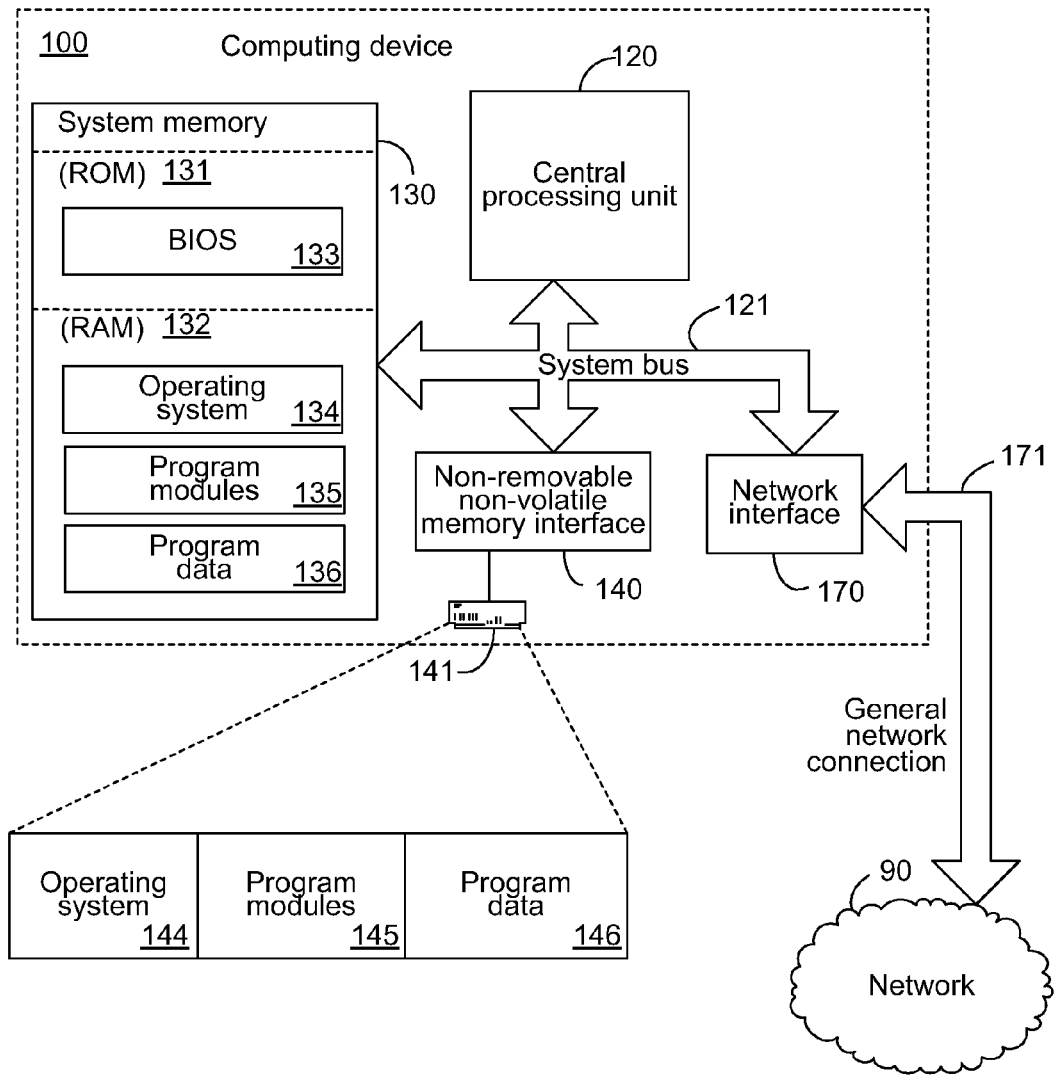
FIG. 2 is a block diagram of an exemplary computing device.

The exemplary computing device 100 of FIG. 2 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Additionally, the computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 3A:
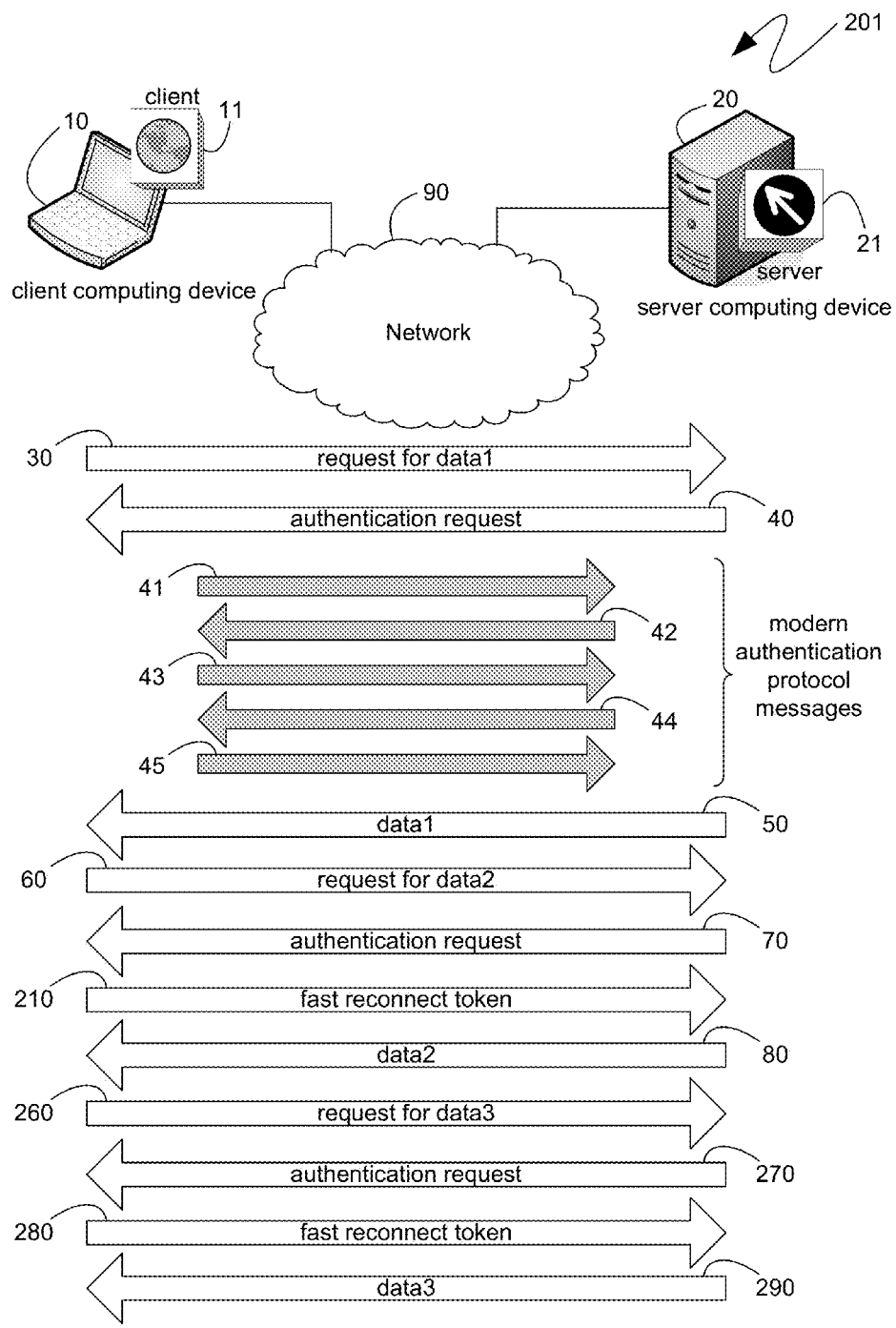
FIGS. 3a and 3b are block diagrams of an exemplary series of network communications comprising fast reconnection authentication.
Figure 3B:
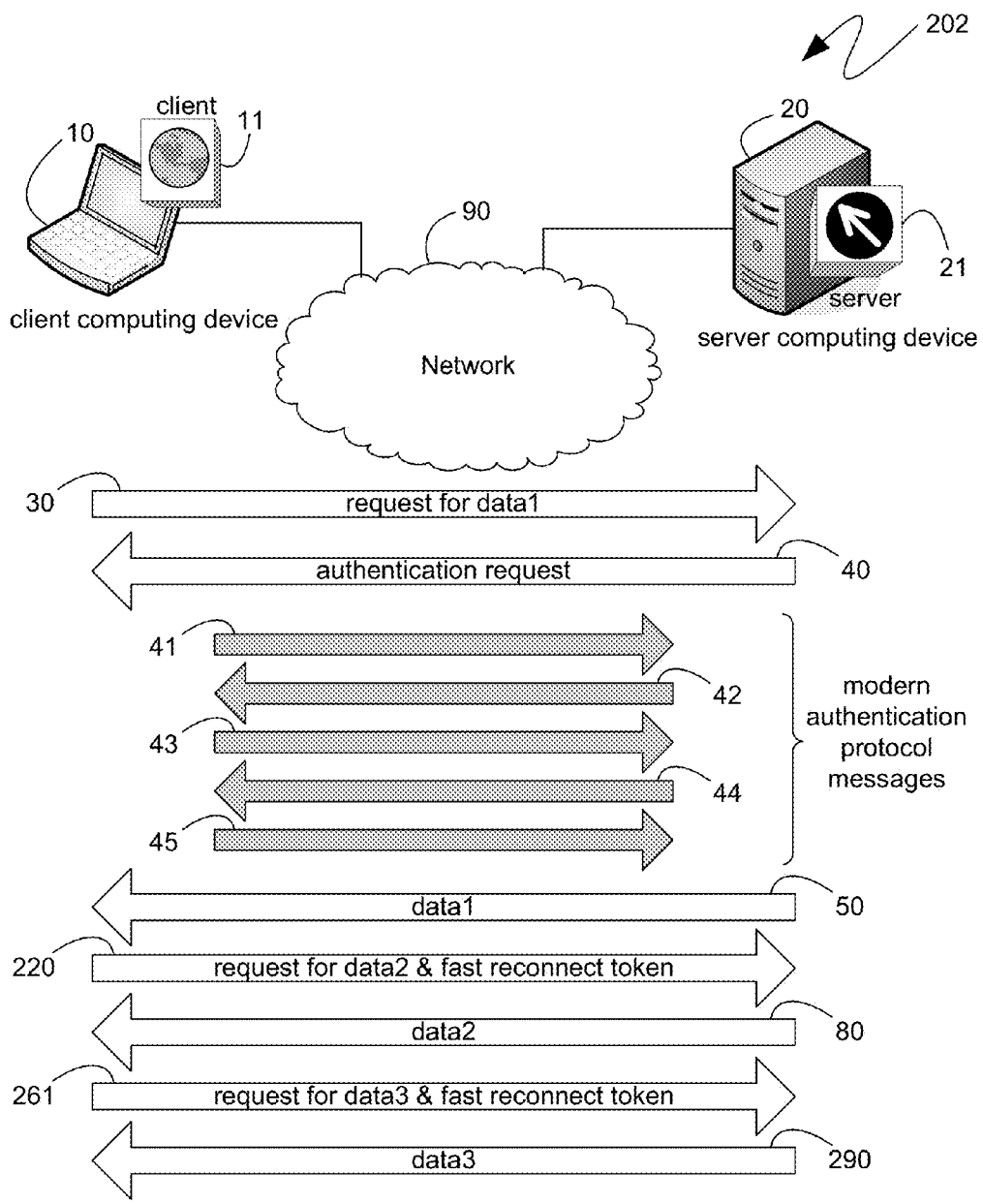

Turning back to FIG. 1, as illustrated, the communications 41 through 45 and 71 through 75 can add substantial overhead to the delivery of data from a server 21 to a client 11. Turning, then, to FIGS. 3a and 3b, the exemplary systems 201 and 202 illustrates improvements in the overhead associated with authentication of a client 11 to a server 21 within the context of the mechanisms described below. Initially, as before, the client 11 can request data via communication 30, and can receive an authentication request 40 from the server 21, thereby initiating exemplary communications 41 through 45 in accordance with whatever authentication protocol was agreed upon between the client 11 and the server 21. Within the context of systems 201 and 202, however, such an agreed upon authentication protocol can provide for a fast reconnection, such as will be described further below.

More specifically, in system 201, as before, upon receipt of the initially requested data via communication 50, the client 11 can request subsequent data via communication 60 and can receive, in response, the authentication request 70. However, rather than exchanging multiple authentication communications, such as communications 71 through 75, as before, the client 11 can, instead, respond to the authentication request 70 with a fast reconnect token, such as via communication 210, as shown. The fast reconnect token, which will be described further below, can comprise information that can enable the server 21 to authenticate the client 11. More specifically, the fast reconnect token can reference and make use of information that may have been established during an initial authentication, such as that illustrated by exemplary communications 41 through 45. With such information the fast reconnect token of communication 210 can enable the server 21 to authenticate the client 11 without additional data or communications and can, thereby, enable the server to send the requested data via message 80, as shown.

Additional requests for data, generically labeled "data3" in FIG. 3a for purposes of distinguishing between the previously requested data, can likewise result in the provision of data with a minimum of messages and information exchanged for authentication purposes. Thus, as shown, the client 11 can request additional data via communication 260 and, in response, receive another authentication request via communication 270. As described, the client 11 can respond to that authentication request with another fast reconnect token sent via communication 280 and can, in response, receive the requested data via communication 290. Thus, as can be seen, there can exist substantially fewer messages between the request for data, such as that sent via communication 260, and the receipt of the data, such as that sent via communication 290, when a fast reconnect mechanism is utilized.

In an alternative embodiment, illustrated with reference to system 202 of FIG. 3b, the client 11 can, in essence, pre-authenticate itself to the server 21 by including the fast reconnect token, such as would have been independently sent in message 210 of the system 201, together with the request for the "data2" of the message 60 of the system 201. Such an amalgamated message 220 is shown in the system 202 of FIG. 3b comprising both the request for data and the fast reconnect token. The message 220, therefore, provides the authentication information of the fast reconnect token before any explicit authentication request is made by the server 21 and, consequently, essentially pre-authenticates the client 11. If the request for "data2" would require authentication, the server 21 can obtain such an authentication from the information of the fast reconnect token, such as will be described further below, that was already included in the message 220. Consequently, in response to the message 220, the server 21 can send the requested data via message 80, as before. Similarly, a subsequent request for additional data can, likewise, include the fast reconnect token, as shown by message 261 and, as a result, the additionally requested data can be sent via message 290 in response. As can be seen, therefore, the pre-authentication illustrated by system 202 of FIG. 3b provides an opportunity to further reduce the quantity of messages exchanged between the client 11 and the server 21, thereby further increasing the efficiency of their conversation.

Figure 4:
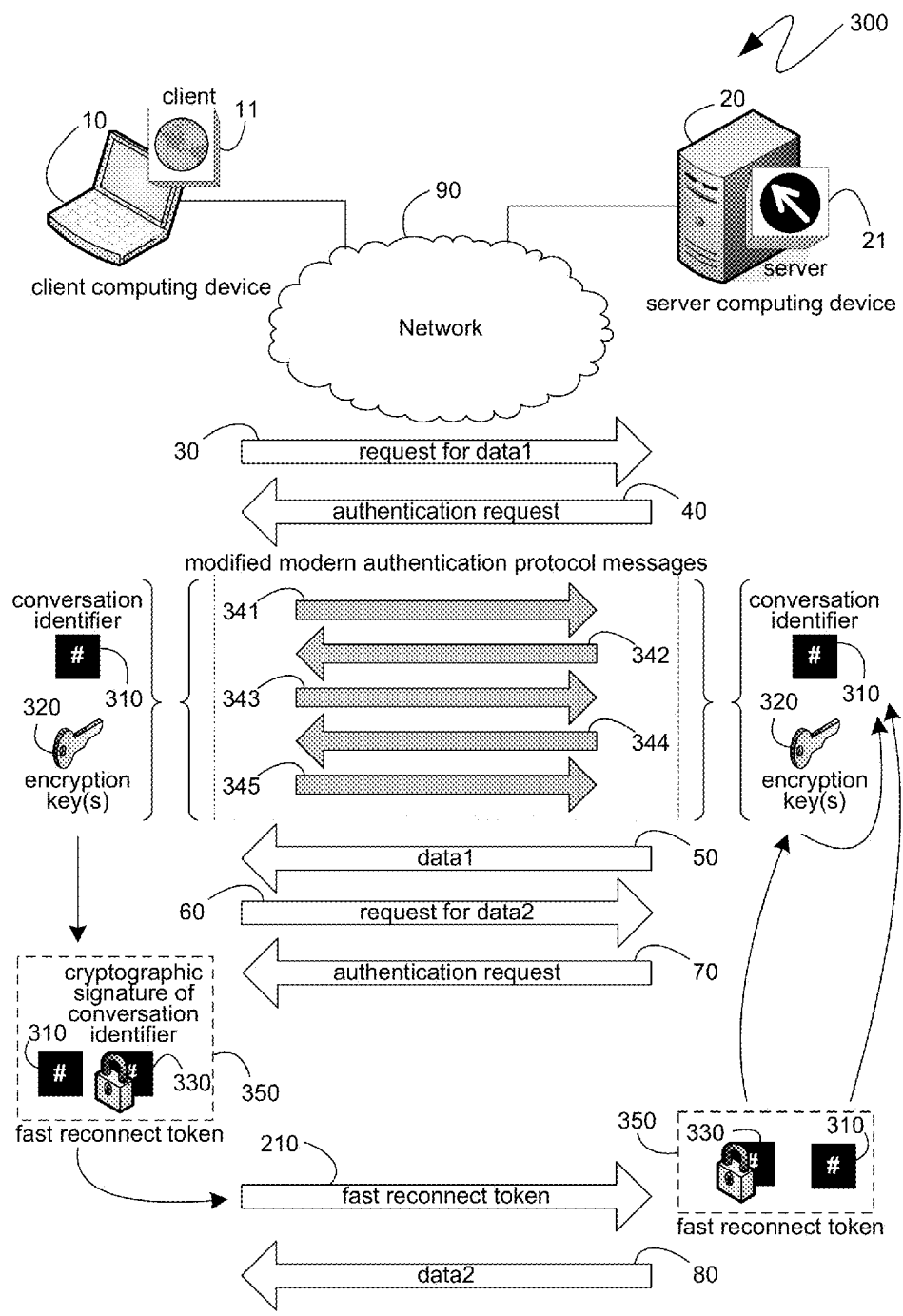
FIG. 4 is a block diagram of another exemplary series of network communications comprising fast reconnection authentication with cryptographic notations.

Turning to FIG. 4, the fast reconnect token sent via messages 210 and 280 of system 201 of FIG. 3a is shown in more detail. In particular, the system 300 of FIG. 4 illustrates that, in one embodiment, the initial authentication performed via the exchange of exemplary messages 341 through 345 can result in both the client 11 and the server 21 having independent access to a conversation identifier 310 and one or more encryption keys 320. The conversation identifier 310 and the encryption keys 320 can be agreed upon by the client 11 and the server 21 in the same, or similar, manner as the agreement of any other commonly utilized values typical of authentication mechanisms. Thus, the agreed upon authentication mechanism between the client 11 and the server 21 need not be modified, other than being extended to provide for the establishing of additional common data; namely the conversation identifier 310 and, if needed, the encryption keys 320. The communications 341 through 345 are shown as having different identifying numbers than the communications 41 through 45 of system 99 to illustrate that, at a minimum, the authentication that they represent has been extended to include the negotiation of a conversation identifier 310 and one or more encryption keys 320.

In one embodiment, the conversation identifier 310 can be a unique numerical, or alpha-numerical, identifier of a particular conversation between the client 11 and the server 21 for which the just-performed authentication is meant to be valid. As will be detailed below, the conversation identifier can act as an identifier by which the server 21 can recognize the previously authenticated client 11 and can, thereby, send data that would otherwise have required a full authentication since, such as when using stateless communication protocols, the server may not have remembered the previously authenticated client and may have asked the client to authenticate itself again, such as in the manner illustrated by system 99. The conversation identifier can, therefore, identify a conversation between the client 11 and the server 21 that remains at the server's discretion to terminate. For example, as will be shown below, if the server receives a conversation identifier that it determines is too old, or has expired, or for which the server has other indicia of maliciousness or other errors, the server can, unilaterally, determine that the client 11 should perform a full authentication. In such a case, the conversation identified by that conversation identifier can be considered to have ended, since the server 21 may no longer accept authentications based on that conversation identifier, and because any subsequent full authentication will likely result in a new conversation identifier. Thus, as used herein, the term "conversation" is meant to reference those communications between a client and a server for which a single conversation identifier can act as a valid re-authentication mechanism in accordance with the methods described further below.

The encryption keys 320 can comprise a single key that can be utilized for both encryption and decryption, or they can comprise multiple keys, including multiple layers of keys, where keys at one layer are derived from keys associated with a prior layer, and including multiple encryption and decryption keys such as a private key that can be utilized for encryption and a public key that can be utilized to decrypt data encrypted with a corresponding private key. The encryption keys 320 can be derived independently by the client 11 and the server 21 in accordance with known authentication and key derivation protocols, or they can be communicated as part of the messages 341 through 345.

In one embodiment, the fast reconnect token 350, such as was sent via communication 210, as indicated above, can comprise the conversation identifier 310 and a cryptographic signature of the conversation identifier 330 that can provide for a measure of security and can enable, for example, the server 21 to determine that the provided conversation identifier 310 was, indeed, from the client 11 that was previously authenticated. Thus, as shown, the conversation identifier 310 and the cryptographic signature of the conversation identifier 330 can be included in the fast reconnect token 350 and provided to the server 21 as a response to the subsequent authentication request, such as authentication request 70. Upon receipt of the fast reconnect token 350, such as from the communication 210, the server 21 can utilize its version of the encryption keys 320 to verify the cryptographic signature of the conversation identifier 330 and the server can also verify the received conversation identifier 310 against its copy of the same conversation identifier 310. If both verifications are successful, the client 11 can be considered authenticated by the server 21 and the server can proceed to send the requested data, such as illustrated by communication 80 of system 300.

Figure 5:
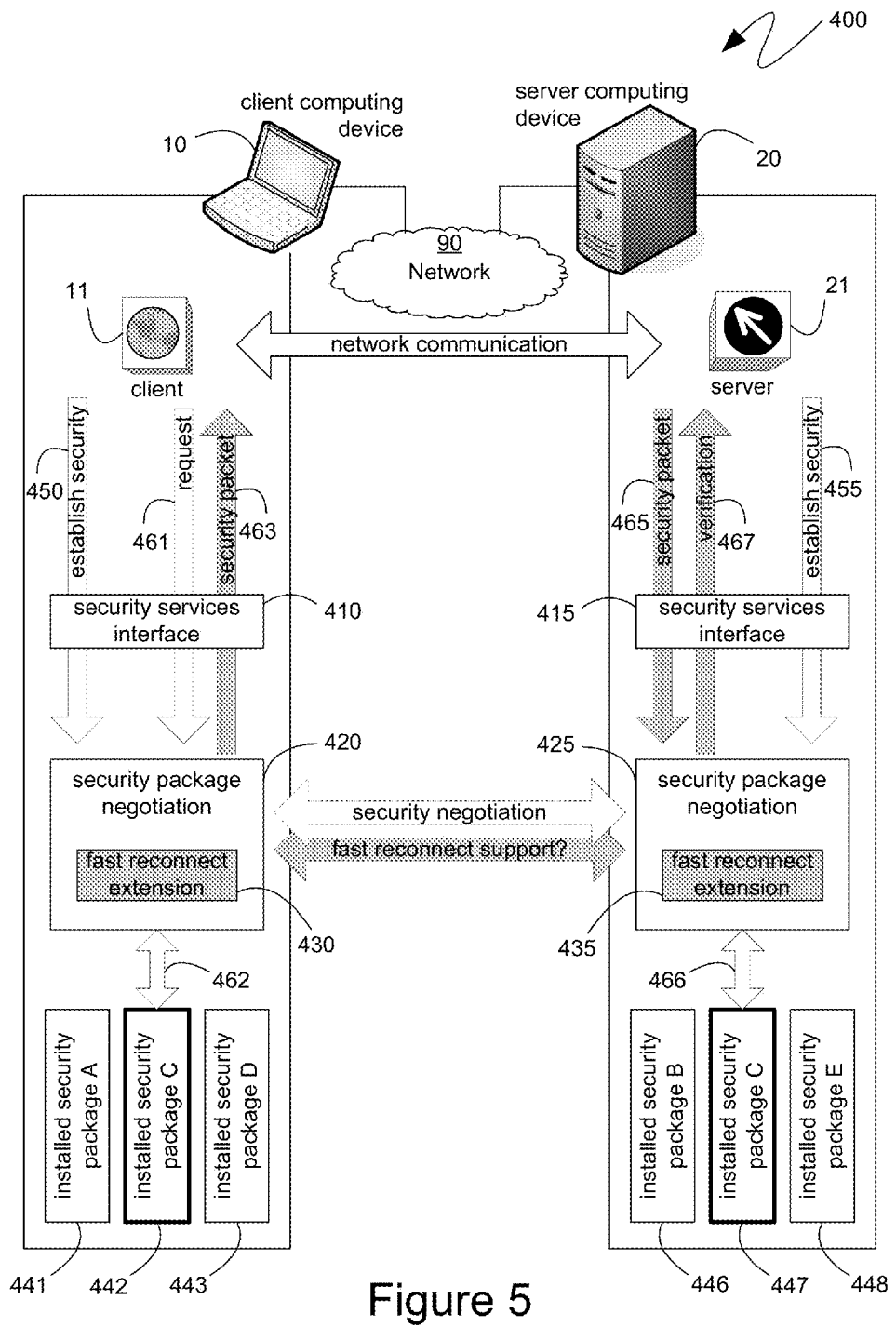
FIG. 5 is a block diagram of an exemplary series of communications providing fast reconnection authentication.

In one embodiment, as illustrated by the system 400 of FIG. 5, existing authentication components can be modified to implement the above described fast reconnect authentication. As shown in FIG. 5, on the client computing device 10, the executing application program client 11 can utilize a security services interface 410 to pass authentication requests to one or more security packages that can comprise computer executable instructions for generating authentication messages, interpreting received authentication messages, and, ultimately performing the authentication. In such a manner, the client 11 need not be modified each time an authentication protocol is introduced or modified. Instead, the client 11 can utilize one or more security packages, each of which can comprise the relevant computer executable instructions for a particular authentication protocol such that only those security packages would need to be updated to accommodate new or changed authentication protocols.

The security services interface 410 on the client computing device 10 can enable multiple higher-level application programs, such as the client 11, to utilize the functionality of the security packages. The client 11 can provide, to the security packages, received authentication-related information and the security packages can provide, to the client, authentication-related packets or data that the client is to transmit to a corresponding application program server 21 with which the client is communicating. The exchange of information between the client 11 and the security packages can be standardized via the security services interface 410 to provide for interoperability and flexibility. The server computing device 20 can, analogously, comprise a security services interface 415 that can similarly enable higher level application programs, such as the server 21, to utilize installed security packages to perform the authentication steps on the server's end of the authentication transaction.

In the exemplary system 400 of FIG. 5, both the client computing device 10 and the server computing device 20 can comprise multiple installed security packages, such as security packages 441, 442 and 443 on the client computing device and security packages 446, 447 and 448 on the server computing device. As described above, each of these security packages can comprise computer executable instructions for enabling at least one authentication protocol. However, as will be known to those skilled in the art, the security packages 441, 442 and 443 available on, for example, the client computing device 10 may not be identical to the security packages 446, 447 and 448 available on another computing device with which the client computing device is attempting to communicate, such as, for example, the server computing device 20. For example, in the illustrated embodiment of FIG. 5, the client computing device 10 can have installed security packages 441, 442 and 443 that can implement authentication protocols generically referred to as "A", "C" and "D", respectively. The server computing device 20, on the other hand, may have installed security packages 446, 447 and 448 that can implement authentication protocols generically referred to as "B", "C" and "E". Thus, in this exemplary illustrated embodiment, the only authentication protocol that both the client computing device 10 and the server computing device 20 have computer executable instructions for implementing is the authentication protocol generically referred to as "C", since the client computing device 10 has installed a security package 442 comprising computer executable instructions for implementing such an authentication protocol, and the server computing device 20 has installed an analogous security package 447 comprising computer executable instructions for implementing that authentication protocol.

To identify an authentication protocol that both the client computing device 10 and the server computing device 20 can accommodate, computer executable instructions for security package negotiation 420 and 425 can, in one embodiment, be executed on the client computing device 10 and the server computing device 20, respectively. The security package negotiation computer executable instructions 420 and 425 can provide, interpret and respond to communications, which can be exchanged by the client 11 and the server 21, and which are directed to identifying an authentication protocol that is both supported by both computing devices, and is acceptable to both the client and the server application programs. As will be known by those skilled in the art, such negotiation can be accomplished through any number of mechanisms, including mechanisms in which each party lists the authentication mechanisms which it can support, because the relevant security package is installed, and mechanisms in which each party can suggest one authentication mechanism for which the relevant security package is installed, and then seek to obtain an agreement from the other party on the suggested authentication mechanism. The precise manner in which an authentication mechanism is negotiated by the security package negotiation components 420 and 425 is not relevant, since the described fast authentication mechanisms are not dependent on the precise negotiation mechanism used.

As shown in system 400 of FIG. 5, the negotiation of the authentication mechanism to be utilized, labeled with the shorthand identifier "security negotiation", can occur between the security package negotiation component 420 on the client computing device 10 and the security package negotiation component 425 on the server computing device 20. However, as will be known by those skilled in the art, the security package negotiation components 420 and 425 may not, necessarily, communicate directly with one another. Rather, the security package negotiation component 420 can provide communications to the client 11 that the client can transmit to the server 21 and the server can then, in turn, provide such communications to the security package negotiation component 425 for further action and response, if appropriate. For example, the client 11 can utilize the security services interface 410 to request, via communication 450, that a suitable authentication protocol be established as part of its connection to the server 21. The server 21 can, likewise, utilize the security services interface 415 to make an analogous request, via communication 455. The security package negotiation component 420 on the client computing device 10 and the security package negotiation component 425 on the server computing device 20 can utilize the client 11 and the server 21, respectively, to send communications to one another, as described, and, thereby, negotiate an authentication mechanism that both the client computing device and the server computing device can accommodate and which is acceptable to both the client and the sever. For example, in the illustrated exemplary system 400 of FIG. 5, the authentication mechanism generically labeled "C" can be selected by the security package negotiation components 420 and 425 due to the presence of a supporting security package 442 on the client computing device 10 and a corresponding supporting security package 447 on the server computing device 20.

After selection of such an authentication mechanism, authentications between the client 11 and the server 21 can be performed with the aid of the relevant security package, such as packages 442 and 447, respectively, via the security services interfaces 410 and 415, respectively. For example, as shown, an authentication request from the server 21 to the client 11 can be communicated, by the client, to the relevant security package 442 via the security services interface 410, as shown by the communication 461 and 462. The security package 442 can construct an appropriate response, in accordance with the authentication protocol it is designed to support, and can provide that response, via the security services interface 410, back to the client 11, as shown by the communication 462 and 463. The client 11 can then send that to the server 21 which can, in turn, use the security services interface 415 on the server computing device 20 to provide the client's communication to an appropriate security package 447, as shown by communications 465 and 466. The security package 447 can process the received data and can provide an appropriate response, such as, for example, another request, or a verification, back to the server 21, again via the security services interface 415, as shown by communications 466 and 467. In such a manner, the authentication between the client 11 and the server 21 can be accomplished with the relevant packages 442 and 447, respectively.

In one embodiment, the computer executable instructions that provide for the security package negotiation 420 and 425 can be modified to include a fast reconnect extension 430 and 435, respectively. Such fast reconnect extensions 430 and 435 can provide computer executable instructions for negotiating both an authentication mechanism, such as in the manner described in detail above, and also negotiating the use of fast reconnection within the context of such a negotiated authentication mechanism. The negotiation of fast reconnect support, as shown in the system 400 of FIG. 5, can, analogously to the security authentication, occur via communications between the client 11 and the server 21 that are sourced, and ultimately provided to, one of the fast reconnect extensions 430 and 435, respectively. For example, concurrently with, or after, the negotiation of the authentication mechanism by the security package negotiation components 420 and 425, the fast reconnect extensions 430 and 435 can negotiate fast reconnect support by each indicating support for fast reconnect and then exchanging information that can, either directly or indirectly, enable each of the fast reconnect extensions to derive or obtain the above described conversation identifier 310 and encryption keys 320. As with the negotiation of the authentication mechanism, the precise method by which fast reconnect support is negotiated is immaterial, except that such negotiation can, in one embodiment, result in both the fast reconnect extension 430 on the client computing device 10 and the fast reconnect extension 435 on the server computing device 20 each having independent access to the same values for both the conversation identifier 310 and the encryption keys 320.

Subsequently, the fast reconnect extension 430 and 435 can provide for fast reconnections, such as those illustrated with reference to system 201 above. More specifically, when a client 11 provides a request for authentication 461 to the security package negotiation component 420 via the security services interface 410, the security package negotiation component can determine, or the fast reconnect extension 430 can inform it, whether a fast reconnect support was negotiated. If such support was negotiated, then, rather than performing full authentication in accordance with, for example, the computer executable instructions of the security package 442 supporting such an authentication, the fast reconnect extension 430 can instead provide the fast reconnect token 350, described in detail above, to the client 11 via the security services interface 410, as indicated by the communication 463. The client 11 can then, as before, communicate the provided data to the server 21, which can, in turn, provide it to the security package negotiation component 425 via the security services interface 415, as shown by communication 465. The security package negotiation 425 can determine, or the fast reconnect extension can inform it, that the received information is part of a negotiated fast reconnection and the fast reconnect extension can verify the provided fast reconnect token 350. If the fast reconnect token 350 is verified, the fast reconnect extension 435 can inform the server 21, via the security services interface 415, as shown by communication 467, that the client 11 has been authenticated. In such a manner, a full authentication can be avoided, and the attendant efficiency benefits can be achieved.

Figure 6:
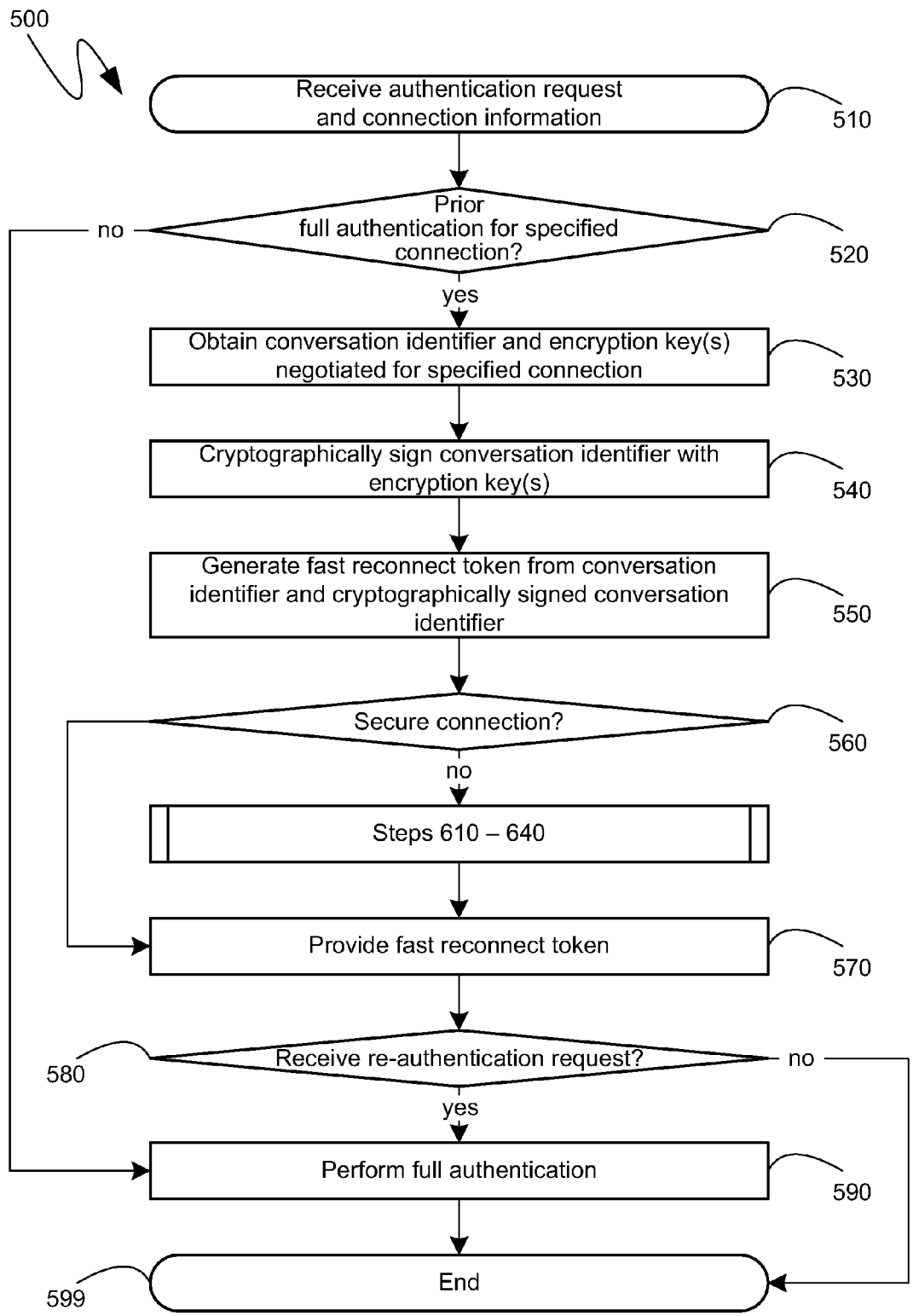
FIG. 6 is a flow diagram of an exemplary fast reconnection authentication.

Turning to FIG. 6, the flow diagram 500 illustrates an exemplary series of steps that can be, in one embodiment, performed by the fast reconnect extension 430 on the client computing device 10 that was shown in FIG. 5 and described in detail above. Initially, as illustrated by step 510, an authentication request directed to the client software application 11 can be provided by the client to the fast reconnect extension 430 via the security services interface 410. The client 11 can likewise provide connection information to enable the fast reconnect extension 430 to determine for which connection the authentication request was received. Such connection information, and the authentication request, can be provided in a standardized manner, such as in accordance with the security services interface 410, in a manner known to those skilled in the art.

Once it receives the information from step 510, the fast reconnect extension 430 can initially determine, at step 520, whether a prior full authentication has been completed for the specified connection. If a full authentication, such as was described in detail above, was not previously completed, then it is possible that the fast reconnect extension 430 may not have access to sufficient information with which to authenticate the client 11 to the server 21 without performing a full authentication and, consequently, processing skips to performing a full authentication at step 590, for instance with an appropriate security package, such as security package 442. If a full authentication was previously performed, as determined by step 520, for the connection specified, then, at step 530, the fast reconnect extension 430 can obtain the conversation identifier 310 and encryption keys 320 that were generated as part of that full authentication.

At step 540, the fast reconnect extension 430 can cryptographically sign the conversation identifier 310 with one or more of the encryption keys 320 to generate the cryptographic signature of the conversation identifier 330. That generated cryptographic signature 330 can then, at step 550, be combined with the conversation identifier 310 to generate the fast reconnect token 350, such as in the manner described in detail above. At step 560, the fast reconnect extension 430 can, optionally, determine if additional security may be necessary, such as, for example, if the communications between the client 11 and the server 21 are not being sent over a secure connection, or are otherwise not part of a network that ensures security. If, as optionally determined at step 560, additional security is desirable, the fast reconnect extension 430 can optionally implement steps 610 through 640, which will be described in greater detail below with reference to the flow diagram 600 of FIG. 7.

If, however, at step 560, the fast reconnect extension 430 determined that no additional security was desirable, then, at step 570, it could provide the fast reconnect token 350, generated at step 550, to the client 11. If the fast reconnect extension 430 subsequently had provided to it a re-authentication request that was received by the client 11, as determined at step 580, the fast reconnect extension could determine that the fast reconnect token 350 did not succeed in performing the requested authentication and, as a result, the fast reconnect extension could let, or request, traditional mechanisms perform a full authentication at step 590, for instance with an appropriate security package, such as security package 442. If no re-authentication request was received, as determined by step 580, and the fast reconnect token 350 was able to authenticate the client 11, or if a re-authentication was required and the full authentication was performed at step 590, processing related to the request at step 510 could, in either case, end at step 599, as shown.

Figure 7:
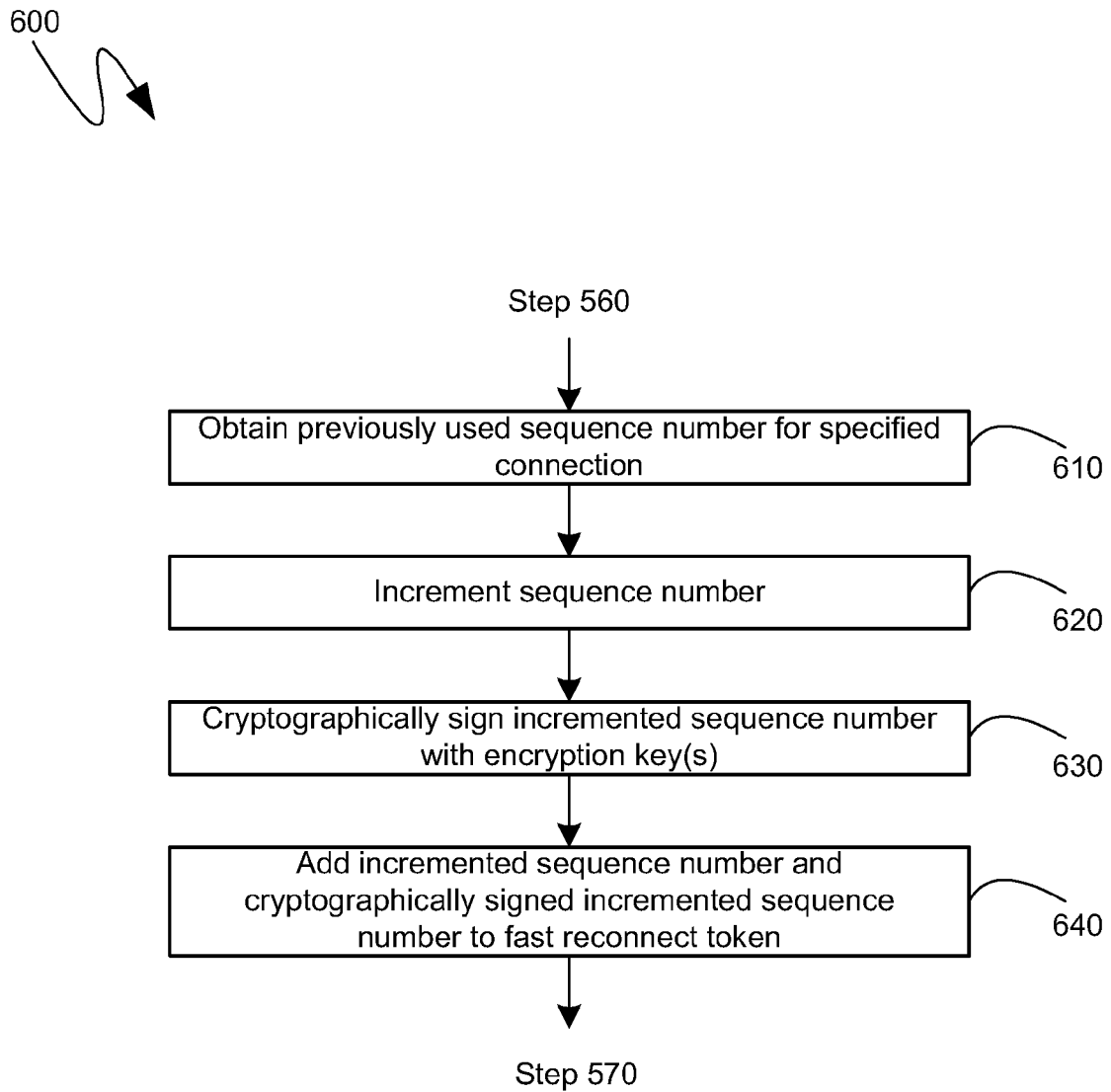
FIG. 7 is a flow diagram of an optional portion of an exemplary fast reconnection authentication.

Turning to FIG. 7, a flow diagram 600 is shown illustrating an optional series of steps that can be performed by, for example, the fast reconnect extension 430 if a measure of additional security is found to be appropriate. More specifically, in one embodiment, a sequence number can be utilized to provide an indication that the client 11 is the client with whom the server 21 has been previously communicating, and has previously authenticated, and is not another, rogue, computing device or application program that is merely attempting to spoof the client 11 by replaying previously intercepted communications between the client and the server. The sequence number can be a number that is initially established between the client 11 and the server 21, such as part of a full authentication process. Thus, the mechanisms described above, in addition to establishing a conversation identifier 310 and one or more encryption keys 320, can likewise establish an initial sequence number. Each communication from the client 11 to the server 21 can result in an incremented sequence number. In one embodiment, to maintain a measure of security, the amount by which the sequence number is incremented can vary within a predetermined range.

In the flow diagram 600, the initial step 610 can be performed if, as indicated previously, the fast reconnect extension 430 optionally checked, at step 560, whether additional security was appropriate and determined that it was. Such additional security can be provided, as indicated, by a sequence number and, consequently, at step 610, the fast reconnect extension 430 can obtain the previously used sequence number for the connection that was specified at step 510. The sequence number obtained at step 610 can then be incremented at step 620. In one embodiment, such an sequencing can be performed in a monotonic fashion, such that each incremented sequence number is linearly greater than the preceding sequence number.

In another embodiment, the incrementing of the sequence number at step 620 can be performed in a non-monotonic manner. For example, the sequence number can be incremented by a random amount that varies with each incrementing. To avoid unreasonably large values, the random amount can be bounded within a specified range. In yet another embodiment, the negotiation of an authentication mechanism which can yield the conversation identifier 310 and the encryption keys 320, as described above, can, analogously, be extended to likewise result in the agreement, between the client computing device 10 and the server computing device 20 of an incrementing process to be utilized for incrementing the sequence number, such as at step 620. Such an agreed upon incrementing process can utilize repeatable mathematical models to generate specific increments to the sequence number, and thereby enable a recipient of an incremented sequence number to verify its propriety.

Once the fast reconnect extension 430 has incremented the sequence number, at step 620, it can proceed to cryptographically sign that incremented sequence number at step 630 using, for example, the previously negotiated encryption keys 320. Subsequently, at step 640, the incremented sequence number and the cryptographically signed incremented sequence number can be added to the fast reconnect token 350, previously generated at step 550. Processing can then return to step 570, where the generated fast reconnect token 350, now with the incremented sequence number and the cryptographically signed incremented sequence number, can be provided to the client application program 11 for transmission to the server application program 21.

Figure 8:
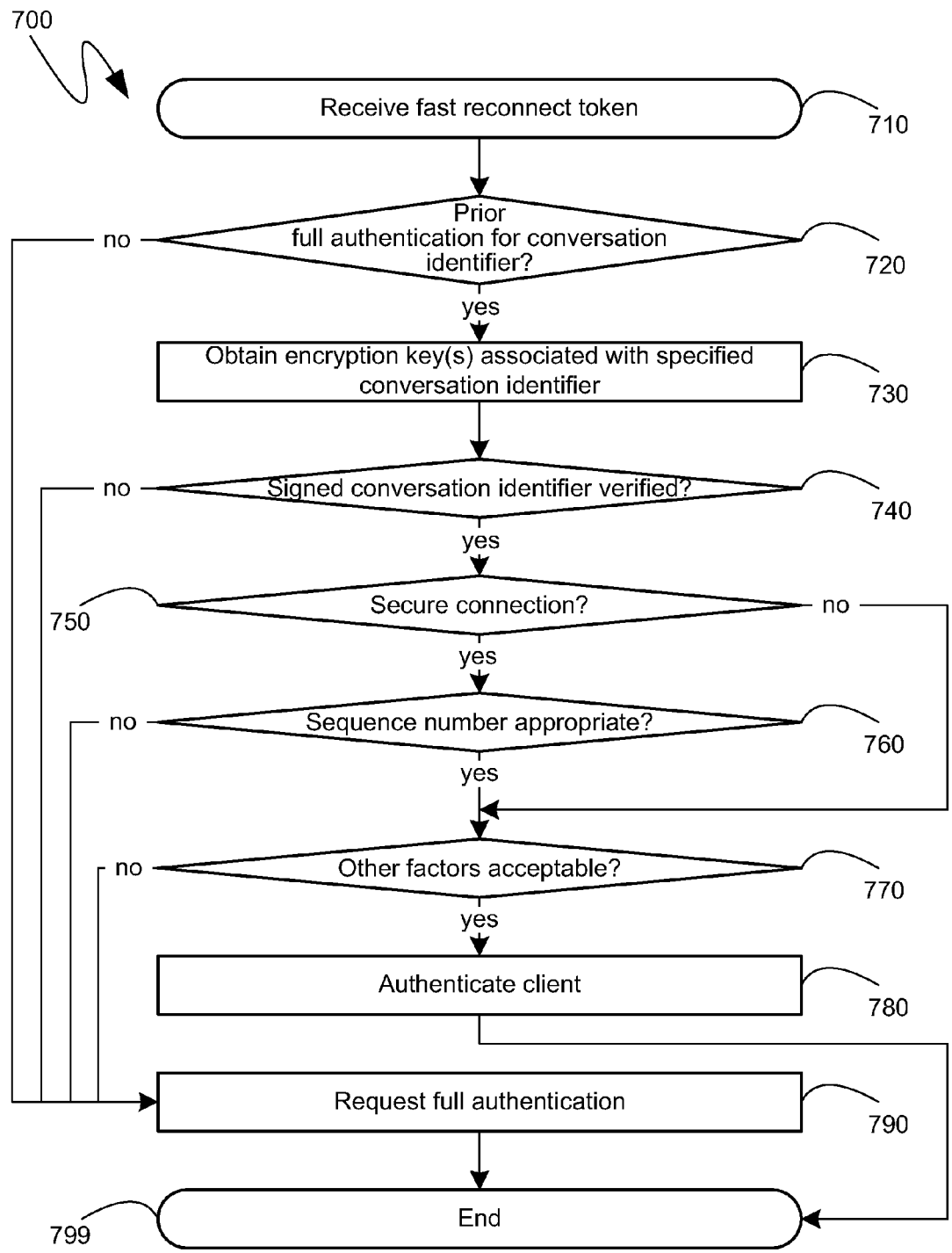
FIG. 8 is a flow diagram of another aspect of an exemplary fast reconnection authentication.

When the fast reconnect token 350 is received by the server application program 21, it can be provided, via the secure services interface 415 to the fast reconnect extension 435 executing on the server computing device 20. The operation of a fast reconnect extension receiving a fast reconnect token 350, such as the fast reconnect extension 435 executing on the server computing device 20, is illustrated in greater detail with reference to flow diagram 700 of FIG. 8. Turning to FIG. 8, initially, at step 710, the fast reconnect extension 435 can receive the fast reconnect token 350 that was initially received by the application program server 21. After receiving the fast reconnect token 350, the fast reconnect extension 435 can first determine, at step 720, whether a full authentication had already been performed that had yielded the conversation identifier 310 specified in the fast reconnect token 350. If no such full authentication had already been performed, as determined at step 720, then the fast reconnect extension 435 can, at step 790, request a full authentication to be performed, such as in the manner described in detail above. The relevant processing can then end at step 799.

If, however, at step 720, the fast reconnect extension 435 determines that a prior full authentication had already been performed, then, at step 730, the fast reconnect extension can obtain the encryption keys 320 associated with the conversation identifier 310 that was received in the fast reconnect token 350. At step 740, then, the fast reconnect extension 435 can use the obtained encryption keys 320 to verify the cryptographically signed conversation identifier 330. If, at step 740, the fast reconnect extension 435 cannot verify the cryptographically signed conversation identifier 330 using the encryption keys 320 associated with the conversation identifier 310 specified in the fast reconnect token 350, then processing can again skip to step 790 where the fast reconnect extension can request a full authentication.

If the fast reconnect extension 435 is, however, able to verify the cryptographically signed conversation identifier 330 at step 740, the fast reconnect extension can proceed to, optionally, determine, at step 750, whether additional security may be appropriate. As indicated previously, additional security can be provided through the use of a sequence number. If, at step 750, the fast reconnect extension 435 determines that additional security is not appropriate, then processing can skip to step 770. However, if the fast reconnect extension 435 determines that additional security is appropriate, such as, for example, if the network is not an internal network or the communications are not otherwise protected, then at step 760, the fast reconnect extension can determine if a sequence number was provided with the fast reconnect token 350 received at step 710 and, if such a sequence number was provided, whether it was an appropriate sequence number given, for example, the prior sequence number utilized and any agreed upon incrementing scheme. If the provided sequence number was not incremented properly or was seen before, or was not included in the fast reconnect token 350, as determined at step 760, then processing can again skip to step 790 where the fast reconnect extension 435 requests a full authentication.

If the sequence number received with the fast reconnect token 350 is proper, or if the additional security provided by the sequence number was deemed unnecessary, then, at step 770, the fast reconnect extension 435 can proceed to determine if there are any other factors that indicate errors, potential maliciousness, or other reasons to request a full authentication. For example, at step 770, the fast reconnect extension 435 can determine if too much time has elapsed since a prior full authentication and, if too much time has elapsed, it can request a full authentication at step 790. Similarly, at step 770, the fast reconnect extension 435 can determine if there are indicia that the connection with the client 11 has been interrupted since the last full authentication and can, in such a case, request a full authentication at step 790. If, however, at step 770, the fast reconnect extension 435 determines that there are no other reasons to request a full authentication, it can proceed to step 780 and authenticate the client 11 with the fast reconnect token 350 received at step 710. Once the client 11 is authenticated at step 780, the server 21 can proceed to send, to the client, the data that the client had requested that had caused the server to request the client to authenticate itself in the first place. As far as the fast reconnect extension 435 is concerned, after authenticating the client at step 780, relevant processing can end at step 799.

As can be seen from the above descriptions, mechanisms for generating and utilizing a token to enable fast authentication have been provided. In view of the many possible variations of the subject matter described herein, we claim as our invention all such embodiments as may come within the scope of the following claims and equivalents thereto.

We claim:

1. One or more computer-readable memory comprising computer-executable instructions for accelerating subsequent authentications of a client application program to a server application program, the computer-executable instructions directed to steps comprising:
    performing an initial authentication of a client application program executing on a client computing device executing the computer-executable instructions to a server application program executing on a server computing device remote from the client computing device, the initial authentication comprising agreeing on a fast reconnect mechanism for subsequent authentications within a single conversation, the single conversation comprising the initial authentication, the agreeing on the fast reconnect mechanism comprising both the client computing device and the server computing device selecting a same identifier of the single conversation and a same set of one or more encryption keys;
    receiving, from the client application program, within the single conversation, a request to subsequently authenticate the client application program to the server application program;
    cryptographically signing, at the client computing device, the identifier of the single conversation using at least one encryption key from among the set of one or more encryption keys; and
    providing the identifier and the cryptographically signed identifier together to the server computing device in response to the receiving the request.

2. The computer-readable memory of claim 1, further comprising computer-executable instructions for obtaining a sequence number utilized for an immediately preceding communication within the single conversation; and incrementing the sequence number; wherein the computer-executable instructions for providing the identifier and the cryptographically signed identifier together to the server computing device further comprise computer-executable instructions for providing the identifier, cryptographically signed identifier and the incremented sequence number to the server computing device in response request.

3. The computer-readable memory of claim 2, wherein the computer-executable instructions for performing the initial authentication further comprise computer-executable instructions for agreeing upon a formula for incrementing the sequence number; and wherein further the incrementing the sequence number is performed in accordance with the formula.

4. One or more computer-readable memory comprising computer-executable instructions for accelerating subsequent authentications of a client application program to a server application program, the computer-executable instructions directed to steps comprising:
    performing an initial authentication of a client application program executing on a client computing device executing the computer-readable instructions to a server application program executing on a server computing device remote from the client computing device, the initial authentication comprising agreeing on a fast reconnect mechanism for subsequent authentications within a single conversation, the single conversation comprising the initial authentication, the agreeing on the fast reconnect mechanism comprising both the client computing device and the server computing device selecting a same identities of the single conversation and a same set of one or more encryption keys;
    receiving, from the client application program, a received identifier and a received signed identifier together, both provided to the server application program, by the client application program, to subsequently authenticate the client application program to the server application program;
    obtaining at least one encryption key from among the set of one or more encryption keys that are associated with the received identifier, the received identifier purporting to identify the single conversation within which the subsequent authentication is being performed;
    verifying, at the server computing device, the received cryptographically signed identifier using the obtained at least one encryption key;
    requesting a full authentication if the received cryptographically signed identifier was not verified; and
    generating an authentication of the client application program to the server application program if the cryptographically signed identifier was verified, the verification proving that the client application program is a same client application program that was initially authenticated within the same conversation.

5. The computer-readable memory of claim 4, further comprising computer-executable instructions for determining if an elapsed time since the previous authentication exceeds a predetermined threshold; wherein the computer-executable instructions for requesting the full authentication comprise computer-executable instructions for requesting the full authentication if either the cryptographically signed identifier of the conversation was not verified using the obtained one or more encryption keys or if the elapsed time since the previous authentication exceeds the predetermined threshold; and wherein further the computer-executable instructions for generating the authentication of the client application program to the server application program comprise computer-executable instructions for generating the authentication of the client application program to the server application program if both the cryptographically signed identifier of the conversation was verified using the obtained one or more encryption keys and if the elapsed time since the previous authentication does not exceed the predetermined threshold.

6. The computer-readable memory of claim 4, further comprising computer-executable instructions for determining if a communicational connection between the client application program and the server application program was interrupted; wherein the computer-executable instructions for requesting the full authentication comprise computer-executable instructions for requesting the full authentication if either the received cryptographically signed identifier of the conversation was not verified or if the communicational connection was interrupted; and wherein further the computer-executable instructions for generating the authentication of the client application program to the server application program comprise computer-executable instructions for generating the authentication of the client application program to the server application program if both the received cryptographically signed identifier of the conversation was verified and if the communicational connection was not interrupted.

7. The computer-readable memory of claim 4, wherein the receiving and the generating are performed through a pre-existing, standardized interface.

8. The computer-readable memory of claim 4, further comprising computer-executable instructions for receiving an incremented sequence number from the client application program; comparing the incremented sequence number to a sequence number utilized for an immediately preceding communication; and determining if the incremented sequence number is appropriate based on the comparing; wherein the computer-executable instructions for requesting the full authentication comprise computer-executable instructions for requesting the full authentication if the received cryptographically signed identifier of the conversation was not verified, or if the determining determined that the incremented sequence number is not appropriate; and wherein further the computer-executable instructions for generating the authentication of the client application program to the server application program comprise computer-executable instructions for generating the authentication of the client application program to the server application program if both the cryptographically signed identifier of the conversation was verified and if the determining determined that the incremented sequence number is appropriate.

9. The computer-readable memory of claim 8, wherein the computer-executable instructions for determining if the incremented sequence number is appropriate comprise computer-executable instructions for determining that the incremented sequence is appropriate if the comparing indicates that the incremented sequence number is appropriately greater than a sequence number utilized for the immediately preceding communication.

10. The computer-readable memory of claim 8, wherein the computer-executable instructions for performing the initial authentication further comprise computer-executable instructions for agreeing upon a formula for incrementing the sequence number; and wherein further the computer-executable instructions for comparing the incremented sequence number to the sequence number utilized for the immediately preceding communication comprise computer-executable instructions for independently generating another incremented sequence number from the sequence number utilized for the immediately preceding communication based on the agreed upon formula, and comparing the other incremented sequence number to the incremented sequence number; and wherein still further the computer-executable instructions for determining if the incremented sequence number is appropriate comprise computer-executable instructions for determining that the incremented sequence is appropriate if the other incremented sequence number is equivalent to the incremented sequence number.

11. A system for reducing authentication overhead in network communications comprising:
a client computing device comprising: a client application program, a client security package performing a full authentication of the client application program to a server application program and agreeing on a fast reconnect mechanism for subsequent authentications within a single conversation, the single conversation comprising the full authentication, and a client fast reconnect component associated with the agreed-upon fast reconnect mechanism, the client fast reconnect component selecting, in combination with server fast connect component, a same identifier of the single conversation and a same of one or more encryption keys, the client fast reconnect component generating, on the client computing device, using at least one encryption key from among the same set of one or more encryption keys, a cryptographic signature of the same identifier of the single conversation for each subsequent communication that requires authentication within the singe conversation between the client application program and the server application program; and
a server computing device communicationally coupled to the client computing device, the server computing device comprising: the server application program, a server security package for performing the full authentication of the client application program to the server application program, and the server fast reconnect component selecting, in combination with the client fast reconnect component, the same identifier of the single conversation and the same set of one or more encryption keys, the server fast reconnect component validating, on the server computing device, the cryptographic signature of the same identifier of the same conversation that was generated by the client fast reconnect component for each subsequent communication within the single conversation between the client application program and the server application program that requires authentication of the client application program to the server application program.

12. The system of claim 11, wherein the client fast reconnect component is an extension to a client security package negotiation component and wherein the server fast reconnect component is an extension to a server security package negotiation component.

13. The system of claim 11, wherein the cryptographic signature of the identifier of the single conversation is generated by the client fast reconnect component using one or more encryption keys agreed upon with the server fast reconnect component as part of the full authentication; and wherein further the validating the cryptographic signature of the same identifier of the single conversation comprises using at least one of the same set of one or more encryption keys.

14. The system of claim 11, wherein the client fast reconnect component further generates on the client computing device, an incremented sequence number from an immediately preceding sequence number; and wherein further the server fast reconnect component validates, on the server computing device, the generated incremented sequence number if the generated incremented sequence number is appropriate.

15. The system of claim 14, wherein the incremented sequence number is generated by the client fast reconnect component in accordance with a formula agreed upon with the server fast reconnect component; and wherein further the determining, by the server fast reconnect component, if the incremented sequence number is appropriate is performed with reference to the agreed upon formula.

16. The system of claim 11, wherein the server fast reconnect component requires another full authentication of the client application program to the server application program if the server fast reconnect component does not validate the cryptographic signature of the same identifier of the single conversation.

* * * * *